April 15, 1969 C. W. FARROW 3,439,278

COUNTER CIRCUIT FOR PROVIDING A SQUARE-WAVE OUTPUT

Filed Jan. 24, 1967

INVENTOR
C. W. FARROW
BY J. P. Kearns
ATTORNE

United States Patent Office 3,439,278

Patented Apr. 15, 1969

3,439,278

COUNTER CIRCUIT FOR PROVIDING A SQUARE-WAVE OUTPUT

Cecil W. Farrow, Monmouth Hills, N.J., assignor to Bell Telephone Laboratories, Incorporated, Murray Hill and Berkeley Heights, N.J., a corporation of New Jersey Filed Jan. 24, 1967, Ser. No. 611,296
Int. Cl. H03k *21/00, 21/08;* H03b *19/00*
U.S. Cl. 328—41 4 Claims

ABSTRACT OF THE DISCLOSURE

A counter circuit is described in which two integrated circuit flip-flops are coupled by an inverter. A NAND gate feeds back a signal when both flip-flops are in their "0" state to enable the counter to provide a symmetrical square-wave output having a frequency one-third the frequency of an applied square-wave signal.

*Field of invention*

This invention relates to a counter circuit for providing a square-wave output and particularly to a digital counter circuit for providing a square-wave output having a frequency $$1/2^N-1$$

the frequency of a square-wave signal applied thereto.

*Background of the invention*

With the rapid growth of data communications, it became convenient to standardize levels and waveshapes transmitted between data processing terminal equipment and data communications equipment. Electronic Industries Association issued in October 1965 an EIA Standard "Interface Between Data Processing Terminal Equipment and Data Communications Equipment" No. RS-232-B, which provides that timing signals sent to the data communication equipment should normally be on and off for equal periods of time. Therefore, if a clock signal were available in the terminal equipment three times the desired frequency of a timing signal, it would be necessary to divide the clock signal by three and maintain a square-wave output.

*Description of prior art*

Various circuits are available for providing an output signal one third the frequency of an applied input signal. One such circuit includes a series resonant circuit tuned to the frequency of the applied signal. The applied signal is fed to the resonant circuit through a resistance so that the peak voltage across an inductor in the resonant circuit exponentially increases from cycle to cycle of the applied signal. The voltage across the inductor is fed to a device such as a gas discharge tube. Such a circuit can provide a square-wave output one third the frequency of an applied square wave but will operate only for applied signals at the tuned frequency of the resonant circuit.

U.S. Patent No. 2,909,675, issued to James O. Edson on Oct. 20, 1959, entitled "Bistable Frequency Divider" shows a system in which positive and negative transitions of an input square wave are used to trigger a flip flop. The triggering sequence of the flip flop is determined by R–C time constants internal to the flip flop and the amplitude of the triggering pulses. The output of the flip flop may be a symmetrical square wave one third the frequency of the input square wave but is dependent for proper operation upon a relatively constant input amplitude and a relatively constant input square-wave frequency range.

Various digital systems have been devised to provide output signals having waveform repetition frequencies equal to submultiples of applied square waves. However, these circuits do not have square-wave outputs.

*Summary of the invention*

The present invention contemplates an "N" state counter circuit which normally advances one count when an applied square wave switches from one value to a second value. One state of the counter is sensed to provide a feedback signal which enables the counter to advance when the applied square wave changes from its second value to its first value.

In one embodiment, a divide-by-four circuit comprising two bistable devices is modified by decoding predetermined states of the bistable devices and feeding back a signal to enable the first bistable device to advance when the input square wave changes from its second value to its first value.

*Detailed description*

Figure 1:
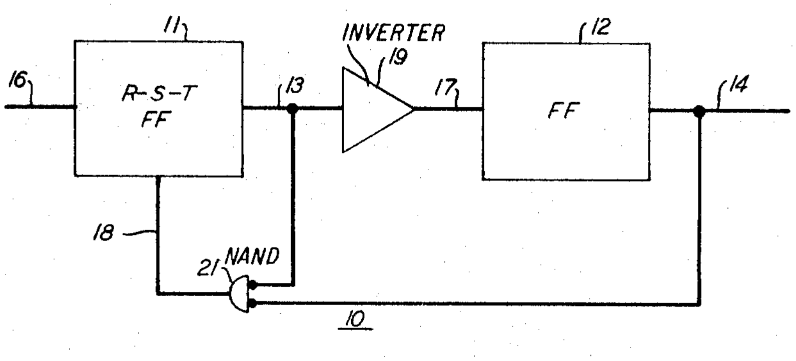
FIG. 1 shows a digital divide-by-three circuit embodying the principles of the invention.

Referring now to FIG. 1, there is shown a counter or divide-by-three circuit 10 embodying the principles of this invention. The counter 10 includes two bistable devices, or flip flops, 11 and 12. It should be understood that counter circuits which divide square-wave frequencies by $2^N-1$ can be constructed according to the principles of this invention employing N bistable devices where N is any integer. The divide-by-three circuit employing two bistable devices is shown by way of example.

The flip flops 11 and 12 are characterized in that they each may occupy at least two states. When one of the flip flops 11 or 12 occupies the first of the two states a voltage will appear on an output lead 13 or 14 respectively representative of a logical "1." When one of the flip flops 11 or 12 occupies the second of the two states a voltage will appear on the output lead 13 or 14 respectively representative of a logical "0." For purposes of this specification "1" shall indicate a logical "1" and "0" shall indicate a logical "0." The flip flops 11 and 12 will switch states or complement when a signal on an input or toggle lead 16 or 17 respectively changes from a "1" to a "0." The first flip flop 11 is further characterized in that a "1" on a second or set input lead 18 will render the flip flop 11 effective to switch states or complement when (1) the signal on the input lead 16 changes from a "0" to a "1" and (2) the signal on the lead 13 is a "0." The flip flop 11 may be a conventional reset, set, toggle flip flop commonly referred to as an R–S–T flip flop. The truth table or storage characteristics of an R–S–T flip flop is shown as FIG. 9 on page 17–09 of "Handbook of Automation Computation and Control," vol. 2, published by John Wiley & Sons, Inc., New York, 1958.

Figure 2:
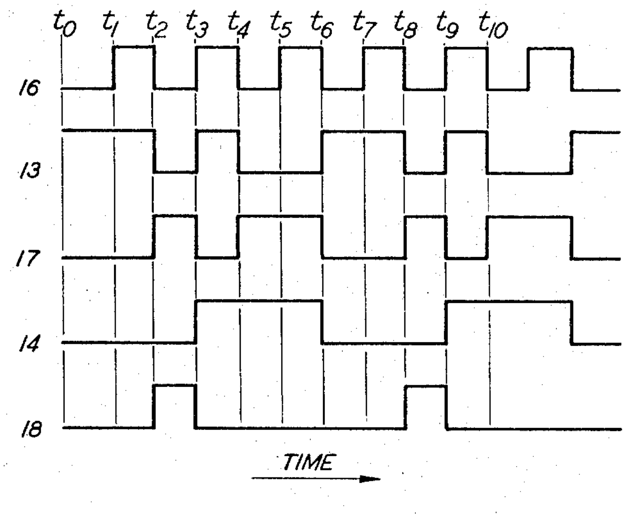
FIG. 2 depicts waveforms at various points in the circuit of FIG. 1 during a normal counting sequence.

A square-wave signal, such as the one shown in FIG. 2, line 16, is applied to the input lead 16 from a source not shown. If the flip flop 11 exhibits a "1" on the lead 13 at time $t_0$, see FIG. 2, line 13, the flip flop 11 will not switch at time $t_1$ when the square wave switches from a "0" to a "1." At time $t_2$ when the square wave 16 switches from a "1" to a "0," the flip flop 11 now switches to provide a "0" on the lead 13. This signal appearing on lead 13 is applied to an inverter 19 so that a signal appearing on the input lead 17 of the flip flop 12 is an inversion of the signal appearing on the lead 13. If the signal on the output lead 14 of the flip flop 12 is a "0" at time $t_2$, a NAND gate 21 will impress a "1" on the lead 18 in response to the "0's" on the leads 13 and 14 (see lines 13, 14, and 18 of FIG. 2).

At time $t_3$, the flip flop 11 will switch states to provide a "1" on the output lead 13. It should be noted here that the flip flop 11 has switched states in response to an input signal going from "0" to "1" which is an inversion of normal operation. This inversion in operation is due to the signal provided on lead 18 by the NAND gate 21 which has sensed the "0"—"0" state of the counter 10. It should be further observed by reference to the timing waveforms shown in FIG. 2 that when flip flop 11 switches from the "0" to the "1" state at time $t_3$, the "1" on the lead 18 is thereby removed returning the counter to a normal counting mode. Also at time $t_3$, the signal appearing on the lead 17 will switch from "1" to "0" therefore switching the flip flop 12. The counter 10 will now continue to advance for every negative transition of the square wave on the lead 16 ($t_4$, $t_6$, and $t_8$) until $t_9$ when the flip flops 11 and 12 again provide "0's" on leads 13 and 14 respectively. At $t_9$ the counter 10 will again advance on a positive transition of the square wave. In this manner, the flip flop 12 is made to switch states for every 1½ cycles of the input square wave 16. One can see by reference to the waveforms in FIG. 2 that the outputs seen on line 14 is a square wave having ⅓ of the waveform repetition frequency of the input square wave seen on line 16.

It is to be understood that the above-described embodiment is simply illustrative of an application of the principles of the invention and many other modifications may be made without departing from the spirit and scope of the invention.

What is claimed is:

1. In combination:

an "N" state counter circuit normally responsive to a first signal switching from a first value to a second value for advancing said counter one count, said counter being rendered effective by a second signal to advance one count when said first signal switches from said second value to said first value; and means for sensing one of said "N" states to provide said second signal.

2. In combination:

a first bistable device, having first and second states, normally responsive to a signal at a toggle input changing from a first value to a second value for complementing said first bistable device;

said first bistable device being rendered effective by a signal at a second terminal to complement in response to said signal at said toggle input changing from said second value to said first value;

a second bistable device, having first and second states, responsive to said first bistable device switching from said first state to said second state for complementing said second bistable device; and means responsive to the simultaneous occurrence of a predetermined one of said first and second states of said first bistable device and a predetermined one of said first and second states of said second bistable device for providing said signal at said second terminal.

3. A combination as defined in claim 2 wherein said second bistable device includes:

an inverter responsive to said first bistable device; and a flip flop responsive to said inverter.

4. A counter circuit responsive to a symmetrical square-wave input signal for providing a symmetrical square-wave output signal comprising:

an R–S–T flip flop having first and second input terminals;

means for applying said input signal to said first input terminal;

an inverter responsive to said R–S–T flip flop;

a bistable device responsive to said inverter for providing said symmetrical square-wave output; and a NAND gate responsive to said R–S–T flip flop and said bistable device for providing a feedback signal to said second input terminal of said R–S–T flip flop.

References Cited

UNITED STATES PATENTS

| | | | |
|---|---|---|---|
| 2,636,984 | 4/1953 | Canfora | 328—39 XR |
| 3,078,417 | 2/1963 | Nick | 328—42 XR |
| 3,151,252 | 9/1964 | Leightner | 328—42 XR |

ARTHUR GAUSS, *Primary Examiner.*

J. ZAZWORSKY, *Assistant Examiner.*

U.S. Cl. X.R.

328—25; 307—220, 225